United States Patent [19]

Dorren et al.

[11] Patent Number: 5,854,986
[45] Date of Patent: Dec. 29, 1998

[54] CELLULAR COMMUNICATION SYSTEM HAVING DEVICE COUPLING DISTRIBUTION OF ANTENNAS TO PLURALITY OF TRANSCEIVERS

[75] Inventors: Bradley John Dorren; Dwayne Erik Shaw, both of Alberta, Canada; Tai Won Youn, Vancouver, Wash.

[73] Assignee: Northern Telecom Limited, Montreal, Canada

[21] Appl. No.: 446,212

[22] Filed: May 19, 1995

[51] Int. Cl.$^6$ ............................................. H04B 1/48
[52] U.S. Cl. ..................... 455/562; 455/103; 455/277.1
[58] Field of Search ................... 455/33.1, 33.3, 455/33.4, 56.1, 132, 137, 129, 101, 103, 277.1, 278.1, 281, 424, 561, 562, 80, 81; 379/59; 333/117, 132, 134, 136; 342/373, 354; 370/276, 297

[56] References Cited

U.S. PATENT DOCUMENTS

| | | | |
|---|---|---|---|
| Re. 34,796 | 11/1994 | Smith et al. | 343/876 |
| 3,740,756 | 6/1973 | Sosin | 343/853 |
| 4,213,132 | 7/1980 | Davidson | 343/854 |
| 4,479,246 | 10/1984 | Young | 455/50 |
| 4,827,270 | 5/1989 | Udagawa et al. | 343/853 |
| 4,916,460 | 4/1990 | Powell | 343/853 |
| 5,025,485 | 6/1991 | Csongor et al. | 455/12 |
| 5,033,108 | 7/1991 | Lockwood | 455/12 |
| 5,175,878 | 12/1992 | Davis | 455/103 |
| 5,243,598 | 9/1993 | Lee | 370/95.3 |
| 5,428,817 | 6/1995 | Yahagi | 455/33.3 |
| 5,701,596 | 12/1997 | Meredith et al. | 455/103 |
| 5,745,858 | 4/1998 | Sato et al. | 455/562 |

FOREIGN PATENT DOCUMENTS

| | | |
|---|---|---|
| 2089701 | 8/1993 | Canada . |
| 0 593 822 | 4/1994 | European Pat. Off. . |
| 0 668 627 | 8/1995 | European Pat. Off. . |
| 4 322 863 | 1/1995 | Germany . |
| 2 279 504 | 1/1995 | United Kingdom . |
| 94/26074 | 11/1994 | WIPO . |

OTHER PUBLICATIONS

Angelucci et al. "High Performance Microstrip Networks for Multibeam and Reconfigurable Operation in Mobile–Radio Systems", IEEE Globecom, vol. 3, pp. 1717–1721, (1994).

Primary Examiner—Wellington Chin
Assistant Examiner—Lee Nguyen
Attorney, Agent, or Firm—Foley & Lardner

[57] ABSTRACT

A device that communicatively couples a number of transmitters and receivers to a number of antennas. The device includes transmit ports each of which may be connected to a respective transmitter, receive ports each of which may be connected to a respective receiver, and antenna ports each of which may be connected to a respective antenna. One coupling unit has inputs connected to each transmit port and outputs to respective antenna ports for combining individual transmit signals received at each transmit port to form a combined transmit signal, and outputs the combined transmit signal to each respective antenna port. A second coupling unit has inputs connected to respective antenna ports and outputs to each receive port for combining individual receive signals from each respective antenna port to form a combined receive signal, and outputs the combined receive signal to the receive ports.

20 Claims, 4 Drawing Sheets

CELLULAR COMMUNICATION SYSTEM HAVING DEVICE COUPLING DISTRIBUTION OF ANTENNAS TO PLURALITY OF TRANSCEIVERS

BACKGROUND OF THE INVENTION

The present invention generally relates to wireless communications and, in particular, to a cellular communication system utilizing a distribution of antennas to transmit low power radio frequency signals. The cellular system includes a device for coupling multiple transceiver radios (i.e., transmitters and receivers) to the distributed antennas, whereby each radio is communicatively connected to all antennas.

A conventional cellular communication system providing service to a large geographic region is typically implemented by partitioning the region into smaller serviceable areas, which form a cluster of contiguous cells generally referred to as a macrocellular network. A macrocellular system is deployed in each cell to support cellular service in its particular area, and all cells are communicatively linked together through a conventional mobile telephone switching network. The mobile telephone switching network also links the cellular system to the public switched telephone network, thereby providing users of mobile telephone units with access to land telephone lines and vice versa.

The basic macrocellular system comprises a base station having multiple transceiver radios, usually ranging between 20 and 100 in number, with different transmission channels (i.e., each radio operating at a unique transmit carrier frequency and a unique receive carrier frequency) and a combiner unit connecting the multiple radios to a common antenna. Each transceiver radio is capable of accepting an input signal, for example a voice signal, from the mobile telephone switching network and modulates the input signal up to its unique transmit carrier frequency. The combiner unit combines the individual transmit channel signals received from all transceiver radios and provides this combined signal to an amplifying unit which subsequently broadcasts the signal over a single antenna. Generally, the power transmitted at the antenna of a macrocellular system ranges between 30 and 70 watts.

In each macrocell system, the broadcast signal is necessarily a high power radio frequency (RF) signal which may propagate a large distance in order to provide coverage spanning the entire geographic area within the periphery of the cell. The propagation, however, is intended to be limited substantially to the boundary of that particular cell so that interference with RF signals of neighboring cells will not occur. In order to mitigate interference problems, each cell operates with a different assigned set of transmission channel frequencies and, moreover, the sets of assigned frequencies would be different for adjacent cells and not repeated except for cells that are far enough away from each other.

These conventional macrocellular systems are primarily utilized in outdoor settings where high power RF signals may easily propagate generally unobstructed by the environment, for instance in metropolitan areas which tend to have a large user demand to warrant the relatively high cost of such base station and antenna structures. There are, however, many "cold spot" areas where cellular service is desired but the demand is not sufficient to warrant such high expenditures or these areas may not be serviceable by conventional macrocellular systems. Cold spots, for example, include outdoor "holes" between macrocell serviced areas; underground pedestrian areas such as subways and downtown shopping corridors; and above ground in-building complexes such as office buildings, warehouses and convention centers. Also, there are "hot spots" in macrocell coverage areas where the capacity of the macrocellular system is not sufficient to support subscriber demand.

Therefore, there is an apparent need for a system that overcomes the above deficiencies of conventional macrocellular systems.

SUMMARY OF THE INVENTION

It is an object of the present invention to provide a new and improved wireless, namely cellular communication system.

According to a first broad aspect of the invention, there is provided a device for communicatively coupling a plurality of transmitters and receivers to a plurality of antennas, comprising: a plurality of transmit ports adapted to be connected to respective transmitters; a plurality of receive ports adapted to be connected to respective receivers; a plurality of antenna ports adapted to be connected to respective antennas; first coupling means having inputs connected to respective transmit ports and outputs connected to respective antenna ports, for combining individual transmit signals received at the transmit ports to form a combined transmit signal and outputting the combined transmit signal to each respective antenna port; and second coupling means having inputs connected to respective antenna ports and outputs connected to respective receive ports, for combining individual receive signals received at the antenna ports to form a combined receive signal and outputting the combined receive signal to the receive ports.

According to a second broad aspect of the invention, there is provided a cellular communication system comprising: a plurality of transmitters and receivers; a distribution of antennas, each antenna defining a zone of coverage within which it transmits and receives signals; a plurality of duplexers each having an antenna terminal connected to a respective antenna of the distribution, and each having a transmit terminal and a receive terminal; first coupling means having inputs connected to respective transmitters and outputs connected to respective transmit terminals of the duplexers, for combining individual transmit signals generated by each transmitter to form a combined transmit signal and providing the combined transmit signal to each duplexer; and second coupling means having inputs connected to respective receive terminals of the duplexers and outputs connected to respective receivers, for combining individual receive signals passed from the duplexers to form a combined receive signal and providing the combined receive signal to the receivers.

According to a third broad aspect, the invention provides a cellular communication system comprising: a base station including: a plurality of antenna ports, a plurality of transmitters and receivers, a plurality of duplexers each having an antenna terminal connected to a respective antenna port, and each having a transmit terminal and a receive terminal, first coupling means having inputs connected to respective transmitters and outputs connected to respective transmit terminals of the duplexers, for combining individual transmit signals generated by each transmitter to form a combined transmit signal and providing the combined transmit signal to each duplexer, and second coupling means having inputs connected to respective receive terminals of the duplexers and outputs connected to respective receivers, for combining individual receive signals passed from the duplexers to form a combined receive signal and providing the combined receive signal to the receivers; and a distribution of antennas, each antenna being connected to a respective antenna port of the base station and each defining a zone of coverage within which it transmits and receives signals.

The cellular system, hereinafter, will be referred to as a "microcell" or "microcellular" system. The microcellular system, in accordance with the present invention, utilizes a distribution of antennas and low power RF energy to provide cost effective cellular coverage in a relatively large area, and may be readily adapted to environments which are not suitable for or serviceable by conventional macrocellular systems. The system incorporates a device having a lower power attenuation characteristic to facilitate a "multicast" distribution of signals, whereby each transmitter and each receiver is communicatively connected to all antennas. The microcellular system, for instance, may be used as an adjunct to the conventional macrocellular system to provide capacity enhancement for "hot spot" high use areas and fill-in coverage for in-building areas that are "cold spots" from a macrocellular coverage point of view. It may be provisioned as indoor customer premise equipment to inter work with a company's communication system for supporting cellular service capabilities inside buildings and may also provide low power coverage outdoors of the buildings through the use of outdoor antennas. Furthermore, the microcellular system may be utilized in tunnels as a means of bridging macrocell coverage outside the tunnel, and also it may be deployed along rural highways to provide inexpensive cellular coverage where cellular traffic is generally sparse.

BRIEF DESCRIPTION OF THE DRAWINGS

The invention will be better understood from the following description of an embodiment of a microcellular communication system together with reference to the accompanying drawings, in which.

DETAILED DESCRIPTION

Figure 1:
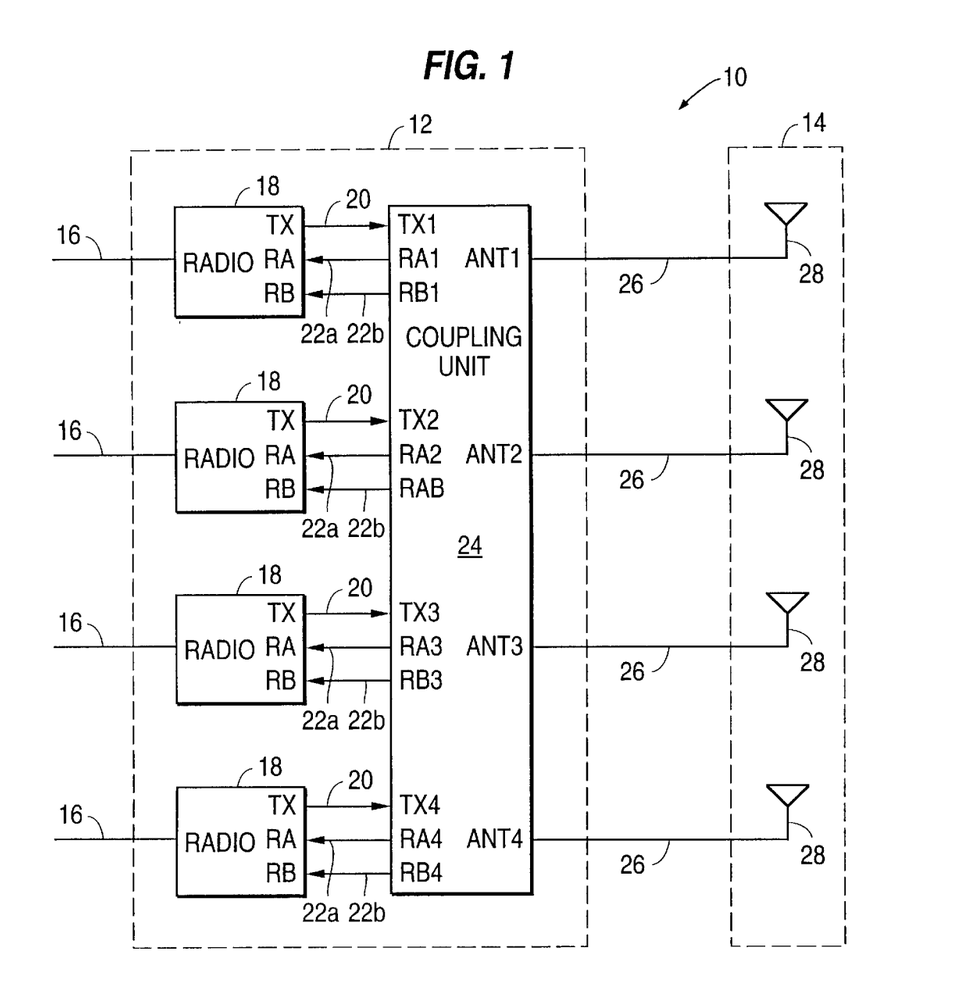
FIG. 1 is a schematic diagram of an embodiment of a microcellular system, in accordance with the invention.

Referring to FIG. 1, illustrated is an embodiment of a microcellular communication system which is generally identified by reference 10. The microcellular system 10 comprises a base station 12 communicatively connected to a distribution 14 of antennas. Links 16 may carry voice and/or data encoded signals between the base station 12 and interfacing communications equipment (not shown) such as a conventional mobile telephone switching network. RF signals broadcast at the antenna distribution 14 generated by the base station 12 may be in accordance with cellular air interface standards to support conventional mobile telephone units (not shown).

The base station 12 includes a plurality of transceiver radios 18 each of which has a transmit path connection 20 and receive path connections 22a and 22b to a coupling unit 24. The coupling unit 24 is connected by cables 26 to each antenna 28 of the distribution 14. Through the coupling unit 24, all radios 18 have a transmit path to and receive path from all antennas 28, such that each antenna 28 will transmit signals from all radios 18 and each radio 18 receives signals from all antennas 28. Not shown in FIG. 1 for simplicity and understood to be present are conventional power supplies for all transceiver radios 18.

The transceiver radios 18 are conventional devices each comprising an integrated transmitter and receiver having functionality that is well known in the art. The transmitter and receiver of each radio 18 generally operate at unique frequency channels within the RF energy spectrum. A particular transmitter, for example, may receive a voice signal on link 16, subsequently modulates the voice signal up to a unique transmit frequency channel and provides the resultant RF signal on transmit path connection 20 to a corresponding transmit port of the coupling unit 24. The receiver of each transceiver radio 18 is preferably a two-branch diversity receiver which has two receive inputs, each accepting a signal from a corresponding receive port of the coupling unit 24 on respective receive path connections 22a and 22b. Each receiver is tuned to a specific frequency channel at which the stronger of the two input receive signals is selected and the recovered signal may be output on link 16. Diversity receivers are well known in the art and the advantageous use of such in the microcellular system 10 will become more apparent from the following description.

The transceiver radios 18 preferably have a transmitter capable of generating output power in the order of 0.5 watts. However, although diversity receivers are preferred they may be replaced with typical one channel receivers. Furthermore, it should be understood that transceiver radios 18 may be readily substituted with separate transmitter radios and receiver radios and, therefore, reference to transceiver radios 18 is intended to cover both configurations.

Figure 2:
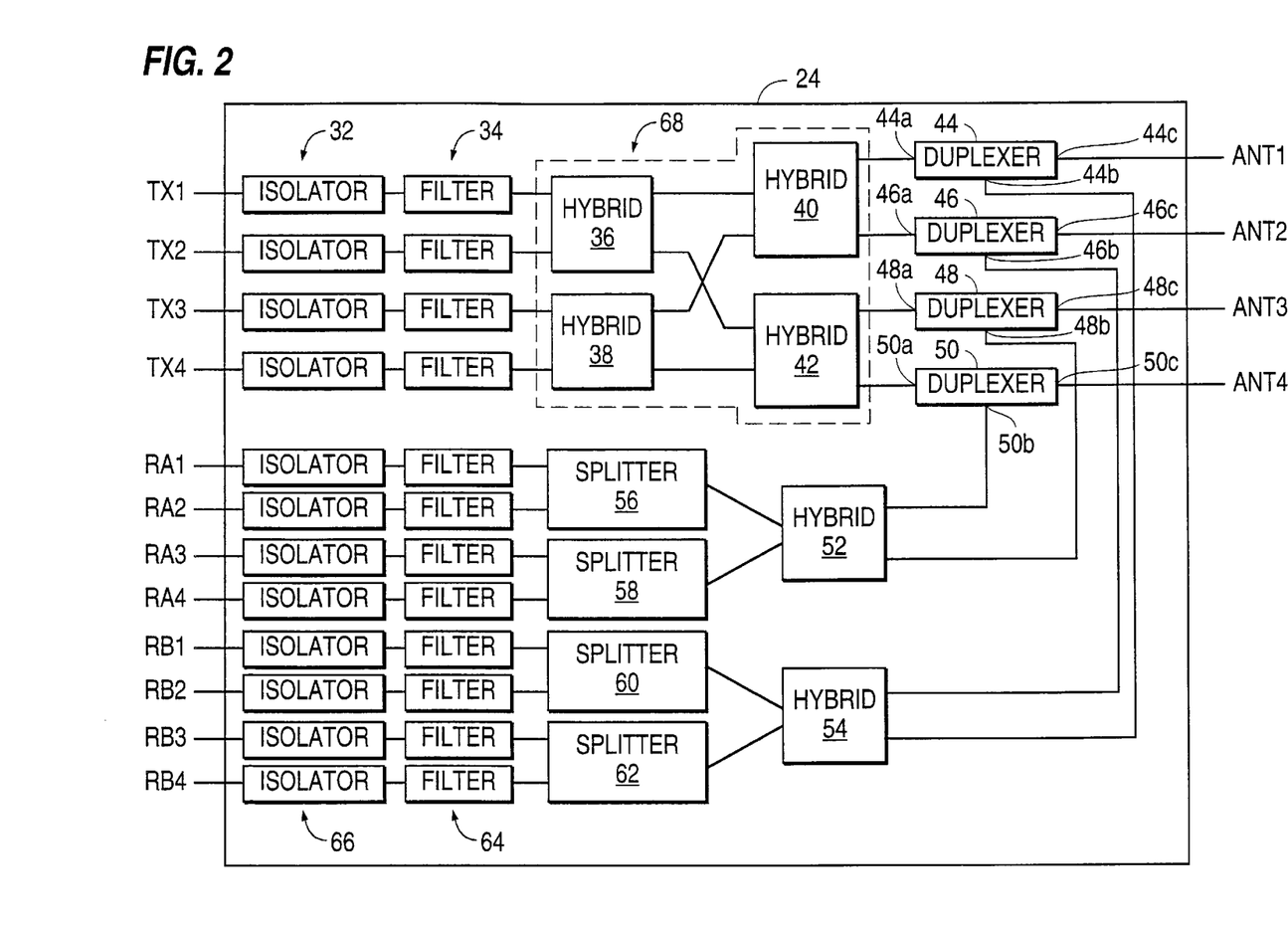
FIG. 2 is a schematic diagram of a coupling unit.

Turning to FIG. 2, shown is a coupling unit 24 configured to support up to four transceiver radios and an antenna distribution having up to four antennas. The coupling unit 24 includes two transmit ports, labeled TX1 and TX2, each respectively connected to an isolator 32 in series with a filter 34 connected to respective inputs of a first 2×2 hybrid power coupler 36. Two further transmit ports TX3 and TX4 are each connected to a respective isolator 32 in series with a filter 34 connected to respective inputs of a second hybrid coupler 38. The hybrid couplers 36 and 38 are connected to two further hybrid power couplers 40 and 42 in the form of a matrix 68, wherein the four outputs of the first pair of couplers 36 and 38 are fed with appropriate cross connections to the second pair of hybrid couplers 40 and 42. The four outputs of the second pair of couplers 40 and 42 are each connected to a respective transmit terminal 44a, 46a, 48a and 50a of duplexers 44, 46, 48 and 50 which in turn have antenna terminals 44c, 46c, 48c and 50c connected to respective antenna ports, labeled ANT1, ANT2, ANT3 and ANT4, of the coupling unit 24.

The receive terminals 44b and 46b of the duplexers 44 and 46 are each connected to an input of 2×2 hybrid power coupler 54, and receive terminals 48b and 50b of the duplexers 48 and 50 are each connected to an input of hybrid coupler 52. The two outputs of coupler 52 are connected to respective one-to-two splitters, such as Wilkinson power splitters, labeled 56 and 58, and the outputs of coupler 54 are connected to respective Wilkinson power splitter 60 and 62. The four outputs of the splitters 56 and 58 are connected to four filters 64 in series with four corresponding isolators 66 which are each connected to a respective receive port RA1, RA2, RA3 and RA4 of the coupling unit 24. The four outputs of the splitters 60 and 62 are each connected to another four filters 64 in series with corresponding isolators 66 which are each connected to a respective receive port RB1, RB2, RB3 and RB4.

For signals applied to transmit ports TX1, TX2, TX3 and TX4, isolators 32 provide isolation between the separate transmit signals in addition to isolation given by the matrix 68 formed by hybrid couplers 36, 38, 40 and 42. The isolators 32 are optional for some applications and utilized essentially to effect high isolation, low insertion loss and produce a good voltage standing wave form. The filters 34 are also optional devices and may be used to attenuate transmit signal harmonics or spurious signals. The filter function may have low-pass, high-pass, band-pass and band-notch characteristics. The isolators and filters may be of any type suitable for the stated purpose.

The matrix 68 of hybrid couplers 36, 38, 40 and 42 functions to combine the individual transmit signals and to direct the combined signal to each antenna port, thereby effecting a transmit path from a transceiver radio connect to any of transmit ports TX1, TX2, TX3 or TX4 to all antennas which are connected to ports ANT1, ANT2, ANT3 and ANT4. Hybrid power couplers are readily available commercial components and utilization thereof produces a broadband device with good port-to-port isolation and balance, a good voltage standing wave form and low insertion (power) loss which is typically in the order of 3.5 dB (i.e., ideal loss of 3 dB as input power is halved to provide two output signals and a practical loss of approximately 0.5 dB resulting from resistance in device). This is advantageous in that the microcellular system is intended to operate at low power levels and because of the low insertion loss achieved by coupling unit 24, in most applications the transmit signals generated by the transceiver radios may be propagated directly to the antenna distribution without further amplification. Consequently the system could be implemented using low cost equipment.

The duplexers 44, 46, 48 and 50 are devices that comprise separate transmit and receive filters which are coupled in a manner that provides the ability to duplex both transmit and receive signals on a single antenna port. In the transmit direction, the duplexers attenuate the out-of-band spurious signals present in the output signals of hybrid couples 40 and 42 together with receive signals at antenna ports and provides the resultant transmit signal to the corresponding antenna port ANT1, ANT2, ANT3 and ANT4. In the receive direction, out-of-band spurious and radio transmit signals are attenuated and the resultant receive signal is passed to the receive port 44b, 46b, 48b and 50 of the particular duplexer.

Receive signals from duplexers 44 and 46 are provided to hybrid coupler 54 which in effect combines the two receive signals from antenna ports ANT1 and ANT2 and outputs the combined signal to splitters 60 and 62 which effectively provide four copies of the same signal, through filters 64 and isolators 66, to receive ports RB1, RB2, RB3 and RB4. Thus, signals from antennas connect to ports ANT1 and ANT2 are provided one input channel of the diversity transceiver radios. In a similar fashion, receive signals applied at antenna ports ANT3 and ANT4 are combined and subsequently outputted at receive ports RA1, RA2, RA3 and RA4 to the second channel of the diversity receiver. Filters 64 are optional and preferably utilized to attenuate out-of-band interferers in the received signal. Isolators 66 are also optional devices and are preferably included to provide additional receive port-to-port isolation.

The coupling unit 24 consists of passive components and preferably utilizes ceramic duplexers and printed circuit board mount components to minimize size and cost, as well as improving manufacturability. Also, the coupling unit 24 is preferably enclosed in a shielded housing to provide EMI/EMC protection. The transmit ports, receive ports and antenna ports may be any type of RF coaxial connectors commercially available. The coupling unit 24 is capable of supporting a forward (transmit) frequency band ranging from 869 to 894 MHz, and has an insertion loss of approximately 11 dB between the transmit ports TX1, TX2, TX3, TX4 and antenna ports ANT1, ANT2, ANT3, ANT4. The designed nominal power level of transmit signals at the antenna ports is preferably in the order of 17 dBm +/−3 dB (i.e., ranging between 25 and 100 milliwatts with a preferred power of about 50 milliwatts) and, therefore, transceiver radios capable of producing transmit signals of approximately 27 dBm are preferred. The coupling unit 24 supports a receive band of frequencies between 824 and 849 MHz, and has a nominal insertion loss of approximately 9 dB between the antenna ports and receive ports. The designed receive signal level at receive ports RA1, RA2, RA3, RA4, RB1, RB2, RB3, RB4 from the antenna distribution is between −30 dBm maximum and −100 dBm minimum.

The coupling unit 24 illustrated in FIG. 2 is configured to support from one to four transceiver radios and from one to four antennas. This particular configuration, however, is for illustrative purposes and it should be obvious that the matrix 24 may be easily modified to support more radios and/or more antennas. The structure of the coupling unit 24 in its receive path is intended to interface with diversity receivers. Otherwise, the combination of hybrid couplers 52, 54 and splitters 56, 58, 60, 62 may be replaced with a matrix arrangement similar to the matrix 68 of hybrid couplers. Moreover, although the use of duplexers is preferred to reduce the number of antenna ports and thus corresponding antennas, it is also possible to use a separate set of antennas and ports to transmit signals and a separate set to receive signals.

Referring back to FIG. 1, the microcellular system 10, in accordance with the present invention, utilizes a distribution of antennas 14 to provide low power coverage over a large area. The power transmitted at each antenna 28 preferably ranges between 50 and 100 milliwatts. The antennas 28 are conventional equipment and various types may be used to provide a range of coverage options including omni-directional and various directional patterns, an may be wide-band antennas that are functional between 824 and 894 MHz. In the embodiment of the base station 12 shown, each antenna 28 is connected by a cable 26 to an antenna port of the base station 12 and internally thereof to one of the four antenna ports ANT1, ANT2, ANT3 or ANT4 of the coupling unit 24. The cables 26 may be coaxial cables having a diameter between 0.250 and 0.500 inches, where the larger diameter cables generally produce less attenuation. Such coaxial cables provide good performance at a reasonable cost, but in certain applications wherein better performance is required larger diameter coaxial or other types of cable, such as fiber optic, may be substituted. Any unused antenna ports may be connected to properly matching terminators, namely 50 ohm terminations.

Figure 3:
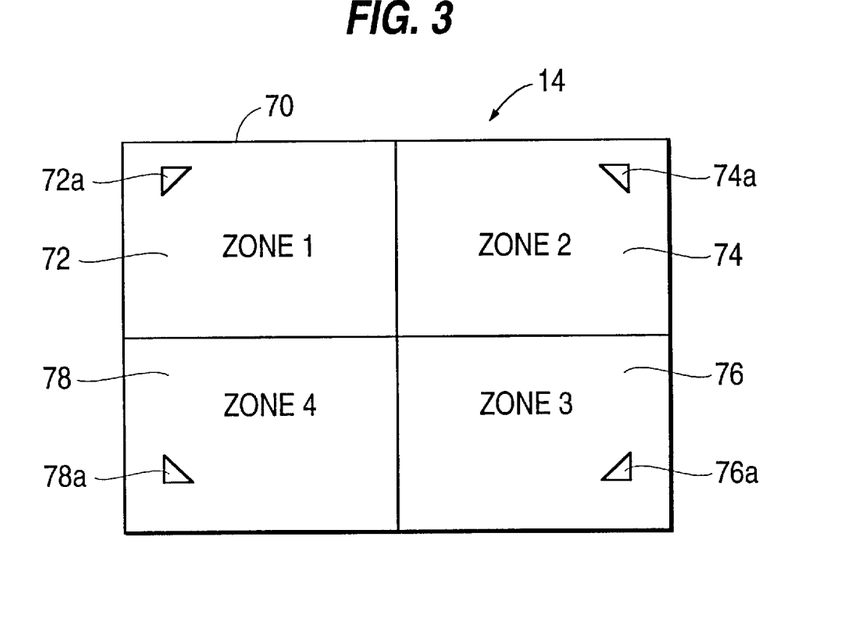
FIG. 3 exemplifies a distribution of antennas.

FIG. 3 exemplifies an arrangement for the antenna distribution 14 defining the microcell coverage area 70. The distribution 14 consists of four antennas 72a, 74a, 76a and 78a whereby the microcell coverage area 70 is partitioned into four contiguous zones 72, 74, 76 and 78, each antenna providing coverage to a corresponding zone. As discussed above, transmit signals originating from the transceiver radios of the microcellular base station are broadcast over all four antennas 72a, 74a, 76a and 78a thereby providing coverage that spans the entire area 70 of the microcell. Furthermore, for diversity receivers, the coupling unit combines receive signals from a first pair of antennas, for example antennas 72a and 76a in respective zones one and three, and provides this combined signal to one of the receive inputs of the transceiver radios. Signals from the second pair of antennas 74a and 78a in respective zones two and four are also combined by the coupling unit 24 which provides this combined signal to the second receive input of the transceiver radios.

As all transceiver radios have transmit paths to and receive paths from all antennas, in accordance with the invention, the use of diversity radios is advantageous in respect of an improved signal to noise ratio over one branch receivers. Without diversity, each radio will see the combination of four antenna receive signals each including the signal originating from a portable telephone unit plus noise. For instance, if the portable telephone unit was in operation in zone one 72, all antennas 72a, 74a, 76a and 78a likely will receive any signal originating from it but the signal received by antenna 72a would have a dominant power level, whereas the signals received by the three other antennas 74a, 76a and 78a in zones two, three and four, respectively, will be weak and primarily contribute unwanted noise. With diversity capabilities, the radios would select the strongest receive signal, in the above example the combined signal from antennas 72a and 76a, and ignore the mostly noise signal from antennas 74a and 78a. It is advantageous to ensure an appropriate antenna connection whereby the full benefit of this diversity capability is achieved. The primary consideration is that signals from alternate antennas (i.e., zones) be combined for provision to each of the receive inputs of the diversity radios.

Figure 4:
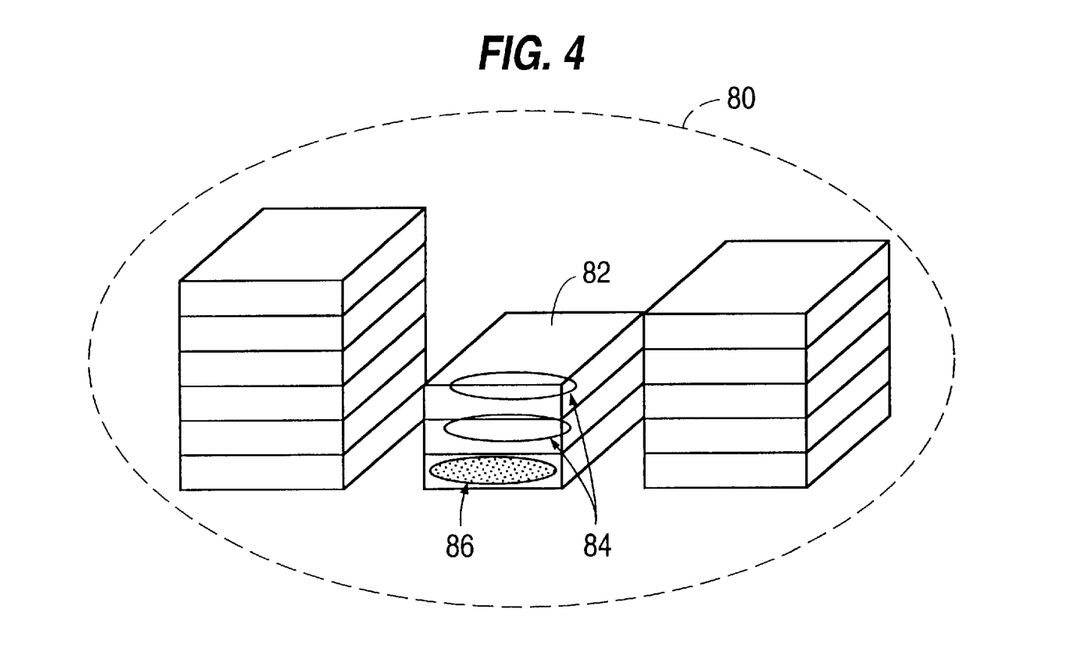
FIG. 4 illustrates a macrocell coverage having an office building within which hot and cold spots exist.

The following describes how the microcellular system may be adapted to an in-building environment that is enveloped by a macrocellular system, to provide hot and cold spot coverage. Referring to FIG. 4, broken line 80 delineates the coverage area of a typical macrocell in a metropolitan setting being serviced by a public macrocellular system. Public means that all cellular subscribers utilizing mobile telephone units may access the service via standard control channels. Cold spots are areas where the macrocellular system cannot provide adequate coverage. For example, macrocell signals may be of sufficient strength to propagate through the exterior walls of an office building 82 to provide service at various floors 84 but may not be able to reach the bottom floor 86 of the building 82. The microcellular system may be used to service cold spots, like bottom floor 86. Floors 84 may be hot spots where the capacity of the macrocellular system may not be sufficient for the amount of cellular traffic (i.e., areas having a large number of mobile telephone users). The microcellular system may be used in these areas to offload the macrocell service thereby increasing the capacity of the area and also ensure good reception. The microcellular system is designed to operate at lower power levels in relation to the enveloping macrocellular service and therefore it may reuse the frequencies from the adjacent macrocells or it may use specific frequency channels dedicated to the microcell.

Both colds spots and hot spots typically exist within the same office building and, for optimum performance, the deployment of the RF subsystem of the microcellular system should be determined for each building individually. The RF subsystem consists of the cables, the distribution of antennas and all other RF components necessary to effect a link between the microcell base station and the portable telephone unit.

For cold spot coverage applications, the signals from the microcells need to fill the areas that are not covered by the macrocells to provide a seamless service across the boundary between the two systems for cellular users. The major sources of interference in cold spots are thermal and man-made noise. The interference level to which the microcells are preferably designed is −100 dBm. This level applies to both frequency reuse systems and dedicated channel systems. In the boundary areas where a portable telephone unit can receive signals from both the microcell and the macrocell system, the portable would access the system having the stronger signal.

In hot spot applications, the microcells are underlaid in the high traffic areas of a macrocell system to off load the macrocell system. In this case, standard Control CHannel (CCH) signals from the microcell must be higher than the CCH signals of the macrocell to ensure that the portable telephone unit will lock onto the microcell CCH signals rather than those of the macrocell system. In addition, if the microcells are reusing the adjacent macrocell frequencies, the microcell control and traffic channel signals must overcome co-channel interference. To meet both criteria, the minimum CCH signals of the microcells are designed to overcome the highest of the two interferences. For example, if the CCH signal of the macrocell is at −70 dBm and the co-channel interference is −80 dBm, the minimum CCH signal that the microcell system should be designed to is higher than −70 dBm. For dedicated channel systems, only the macrocell CCH signals have to be taken into account. The range of interference that the microcells are preferably designed to accommodate for hot spot applications is from −68 dBm to −100 dBm. For areas that the maximum interference is greater than −68 dBm, the effective coverage area of the microcell is reduced.

The embodiment of the microcellular system 10 illustrated in FIG. 1 includes up to four transceiver radios 18 and up to four antennas 28 in the distribution 14. As discussed above, its capacity may be expanded by modifying the arrangement of the coupling unit to support more radios 18 and/or antennas 28. Once the microcellular system 10 has been designed to comprise a specific number of transceiver radios 18 and antennas 28 which is essentially based on an anticipation, in general, of capacity requirements of potential customers, thereafter the system 10 is ideally produced on a relatively large scale thereby minimizing costs associated with manufacturing. Therefore, although redesigning the microcellular system 10 to conform with the specific needs of a customer may be done easily in terms of engineering the modified system, such would be costly form a manufacturing point of view.

Alternatively, the microcellular system 10 is capable of the following system expansions through the use of further combiner and splitter devices which are provided externally to the base station 12 and have a rather small impact on transmit power of approximately 3.5 dB.

Figure 5A:
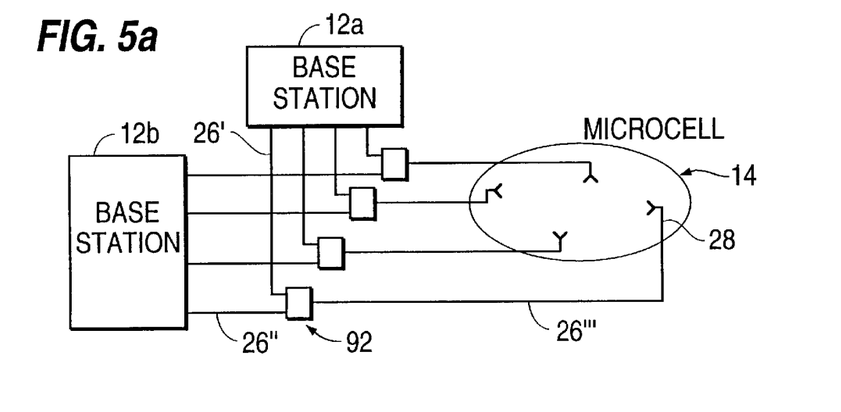
FIGS. 5a, 5b and 5c illustrate alternative embodiments of the microcellular system.

With regard to a coverage area wherein the number of anticipated mobile telephone users exceeds the capabilities of a single microcellular system 10, which capabilities specifically are a function of the number of transceiver radios 18 included within the system, another microcellular system may be overlaid in the same area thereby effectively doubling the caller capacity in the coverage area. This configuration utilizes two separate base stations respectively connected to two separate antenna distributions. However, it is preferable to have both base stations communicate with a single antenna distribution to reduce equipment costs. In FIG. 5a, two-to-one combiner devices 92 (i.e., hybrid power couplers) are used to combine the antennas ports of two separate base stations 12a and 12b. An antenna port of station 12a and an antenna port of station 12b are connected by cables 26' and 26", respectively, to the two inputs of the combiner 92 and its single output is connected by cable 26''' to a respective antenna in the four antenna distribution 14. The FIG. 5a variant provides eight transceiver radios thereby increasing traffic capacity, but the effective coverage area may decrease due to the loss in combiner devices 92. This configuration is beneficial in large open areas like halls or convention centers.

Figure 5B:
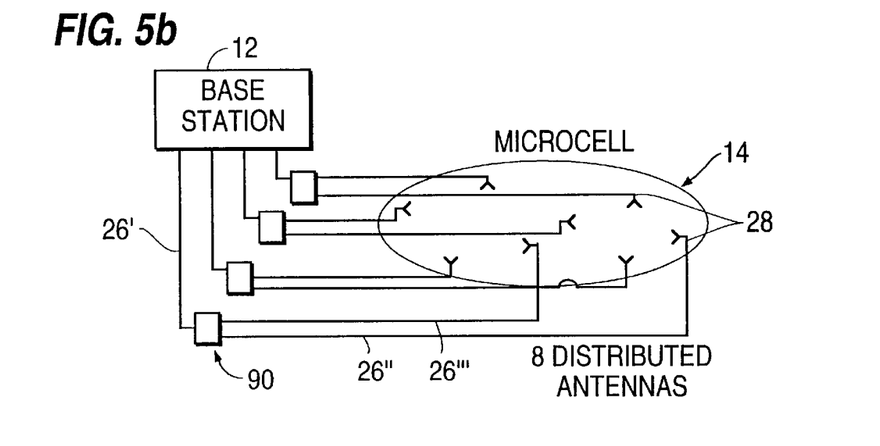

With respect to coverage areas, such as long and narrow corridors in an office building, that typically are high loss environments or where lower power signal transmissions are required to reduce health hazards, the arrangement shown in FIG. 5b may be advantageous. The variant in FIG. 5b represents an expansion to eight antennas, wherein each of the four antenna ports of the base station 12 is connected by a cable 26' to a respective input of a one-to-two splitter 90. The two outputs of each splitter 90 are connected through separate cables 26" and 26''' to respective antennas 28 in the distribution 14 which now contains eight antennas 28 in total. The splitter 90 attenuates the input transmit signal by approximately 3.5 dm to produce the two output signals and therefore the power transmitted at each antenna 28 is essentially halved in relation to the four antenna system. However, in terms of total coverage area the configuration in FIG. 5b is at least the same as the prior system because the number of antennas is double and it offers more flexibility with regard to shaping the coverage area. Moreover, the coverage area may effectively increase because positioning of the antennas 28 may now be adapted to better suite the servicing environment resulting in a more efficient system.

Figure 5C:
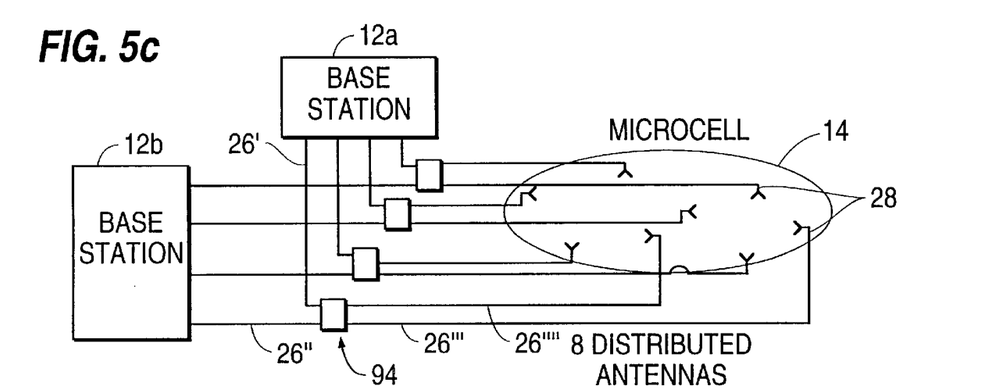

The variant in FIG. 5c utilizes 2×2 combiner 94 (i.e., hybrid power coupler) to couple two base stations 12a and 12b to a distribution 14 of eight antennas 28, whereby both capacity and flexibility in shaping coverage area are increased. An antenna port of station 12a and an antenna port of station 12b are connected by cables 26''' and 26'''', respectively, to the two inputs of the combiner 94. The two outputs of combiner 94 are connected by cable 26''' and 26'''' to respective antennas in the eight antenna distribution 14.

Those skilled in the art will recognize that various modifications and changes could be made to the invention without departing from the spirit and scope thereof. It should therefore be understood that the claims are not to be considered as being limited to the precise embodiments of the microcellular system set forth above, in the absence of specific limitations directed to each embodiment.

We claim:

1. A device for communicatively coupling a plurality of transmitters and receivers to a plurality of antennas, comprising:
    a plurality of transmit ports adapted to be connected to respective transmitters;
    a plurality of receive ports adapted to be connected to respective receivers;
    a plurality of antenna ports adapted to be connected to respective physically remote, duplexed antennas, each antenna being located in and providing coverage to a different zone;
    first coupling means having inputs connected to respective transmit ports and outputs connected to respective antenna ports, for combining individual transmit signals received at the transmit ports to form a combined transmit signal and outputting in parallel the combined transmit signal to each respective antenna port; and
    second coupling means having inputs connected to respective antenna ports and outputs connected to respective receive ports, for combining individual receive signals received at the antenna ports to form a combined receive signal and outputting the combined receive signal to the receive ports,
    wherein said device passively couples the plurality of transmitter and receivers to the plurality of antennas for transmission of radio frequency signals therebetween.

2. A device as claimed in claim 1, wherein the antenna ports to which the outputs of said first coupling means are connected are distinct from the antenna ports to which the inputs of said second coupling means are connected.

3. A device as claimed in claim 1, comprising a plurality of duplexers each of which has a transmit terminal connected to a respective output of said first coupling means, a receive terminal connected to a respective input of said second coupling means and an antenna terminal connected to a respective antenna port, whereby both transmit signals and receive signals pass through the same antenna port.

4. A device as claimed in claim 3, wherein said first and second coupling means include hybrid power coupler means.

5. A device as claimed in claim 4, wherein said first coupling means is formed from a matrix of 2×2 hybrid power couplers.

6. A device as claimed in claim 5, comprising an isolator and filter connected in series between each transmit port and input of said first coupling means and between each receive port and output of said second coupling means.

7. A device as claimed in claim 6, comprising terminators at any unused transmit, receive or antenna ports.

8. A device as claimed in claim 1, wherein said receivers to which said device is adapted for connection are diversity receivers having first and second inputs,
    said plurality of receive ports including a first set of ports and a second set of ports for connection to the first and second inputs, respectively, of the diversity receivers, and
    said second coupling means includes first hybrid coupler means for combining individual receive signals from some of said plurality of antenna ports to form a first combined receive signal and second hybrid coupler means for combining individual receive signals from others of said plurality of antenna ports to form a second combined receive signal, said first combined receive signal being provided to each receive port of the first set and said second combined receive signal being provided to each receive port of the second set.

9. A device as claimed in claim 8, wherein said first and said second hybrid coupler means are formed from 2×2 hybrid power couplers having outputs connected to one-to-two splitters.

10. A cellular communication system comprising:
    a plurality of transmitters and receivers;
    a distribution of antennas physically remote from each other, each antenna defining a zone of coverage within which it transmits and receives signals;
    a plurality of duplexers each having an antenna terminal connected to a respective antenna of said distribution, and each having a transmit terminal and a receive terminal;
    first coupling means having inputs connected to respective transmitters and outputs connected to respective transmit terminals of said duplexers, for combining individual transmit signals generated by each transmitter to form a combined transmit signal and providing in parallel said combined transmit signal to each duplexer; and second coupling means having inputs connected to respective receive terminals of said duplexers and outputs connected to respective receivers, for combining individual receive signals passed from said duplexers to form a combined receive signal and providing the combined receive signal to said receivers, wherein said duplexers, said first coupling means, and said second coupling means passively communicatively couple said transmitter and said receivers to said antennas.

11. A cellular communication system as claimed in claim 10, wherein said first and second coupling means include hybrid power coupler means.

12. A cellular communication system as claimed in claim 11, wherein said first coupling means is formed from a matrix of 2×2 hybrid power couplers.

13. A cellular communication system as claimed in claim 12, comprising an isolator and filter connected in series between each transmitter and input of said first coupling means and between each receiver and output of said second coupling means.

14. A cellular communication system as claimed in claim 10, wherein said receivers are diversity receivers having first and second inputs, and said second coupling means includes first hybrid coupler means for combining individual receive signals originating from a first set of said antennas to form a first combined receive signal and second hybrid coupler means for combining individual receive signals originating from a second set of said antennas to form a second combined receive signal, said first combined receive signal being provided to each first input of said diversity receivers and said second combined receive signal being provided to each second input thereof.

15. A device as claimed in claim 14, wherein said first set contains antennas from said distribution in alternate zones and said second set contains other antennas from said distribution in alternate zones.

16. A device as claimed in claim 15, wherein said first and said second hybrid coupler means are each formed from 2×2 hybrid power couplers having outputs connected to one-to-two splitters.

17. A cellular communication system comprising:

a plurality of antenna ports;

a plurality of transmitters and receivers;

a plurality of duplexers each having an antenna terminal connected to a respective antenna port, and each having a transmit terminal and a receive terminal;

first coupling means having inputs connected to respective transmitters and outputs connected to respective transmit terminals of said duplexers, for combining individual transmit signals generated by each transmitter to form a combined transmit signal and providing in parallel said combined transmit signal to each duplexer;

second coupling means having inputs connected to respective receive terminals of said duplexers and outputs connected to respective receivers, for combining individual receive signals passed from said duplexers to form a combined receive signal and providing the combined receive signal to said receivers; and a distribution of antennas physically remote from each other, each antenna being connected to a respective antenna port of said base station and each defining a zone of coverage within which it transmits and receives signals, wherein said duplexers, said first coupling means, and said second coupling means passively communicatively couples said transmitters and said receivers to said antennas.

18. A cellular communication system as claimed in claim 17, comprising a splitter having an input and two outputs, wherein an antenna port of said base station is connected to the input of said splitter, and the two outputs of said splitter are connected to respective antennas in said distribution.

19. A cellular communication system as claimed in claim 17, comprising another base station and a combiner having two inputs and a single output, wherein an antenna port of said base station and an antenna port of said another base station are connected to respective inputs of said combiner, and the output of said combiner is connected to a corresponding antenna in said distribution.

20. A cellular communication system as claimed in claim 17, comprising another base station and a combiner having two inputs and two output, wherein an antenna port of said base station and an antenna port of said another base station are connected to respective inputs of said combiner, and the two outputs of said combiner are connected to respective antennas in said distribution.

* * * * *